Patented June 11, 1940

2,204,501

UNITED STATES PATENT OFFICE 2,204,501

METHOD FOR OBTAINING PURE NOBLE GASES

Alwin Krauss, Frankfort - on - the - Main - Griesheim, Germany, assignor to I. G. Farbenindustrie Aktiengesellschaft, Frankfort-on-the-Main, Germany No Drawing. Application October 6, 1937, Serial No. 167,675. In Germany October 9, 1936

5 Claims. (Cl. 23—2)

When rare or inert gases, i. e., gases of the group of argon are obtained from air there are first produced, by a rectification, mixtures of these inert gases with nitrogen and oxygen. Neon and helium thus substantially contain nitrogen; krypton and xenon contain oxygen, whereas argon is impurified by nitrogen and oxygen. These mixtures are further purified suitably not by a repeated rectification, but there are applied advantageously chemical processes or processes which are based on adsorption proceedings.

Particularly pure gases may thus be obtained; they correspond to all requirements which noble gases have to fulfil when they are used as a filling for gas discharge tubes and incandescent lamps.

In order to remove the nitrogen always contained in crude gases it has been proposed to pass the gases over heated alkali metals or alkaline earth metals in a finely subdivided form. For this purpose the use of calcium chips has been found to be particularly suitable. These calcium chips are heated to temperatures between about 400° C. and about 700° C., preferably to a temperature of about 600° C. If other metals are used for this purpose, also other temperatures may be optimal; in the case of barium, for instance, a temperature of about 300° C. is already sufficient. As the gases other than the inert gases are also bound by calcium, for instance hydrogen as hydride, hydrocarbon as calcium carbide and hydride, oxygen as oxide, it would be assumed that a product free from all gases other than the inert gases would thus be obtained. It has, however, been found that the gas purified in the manner herein described still contains a small quantity of hydrogen and hydrocarbons so that it is unsuitable for the production of incandescent lamps, the impurity by these hydrocarbons being due to the fact that some of them, such as methane which is present in the crude gas in small quantities reacts with the calcium only at temperatures between 800° C. and 900° C. The calcium can, however, not be heated to this degree because it fuses already at 850° C. The hydrogen content is probably the result of the calcium hydride possessing a small hydrogen partial pressure. At any rate this partial pressure is already very considerable at the temperatures which are necessary for the destruction of the methane.

Now I have found that this difficulty can be overcome by inserting a furnace containing metal oxide having an oxidizing action in front of and behind the furnace charged with calcium. As metal oxides having an oxidizing action there may be used copper oxide, manganese oxide or the like, or mixtures of such oxides or prepared contacts containing such oxides. The first named furnace serves for the destruction of the methane and is heated to about 900° C. By the last-named furnace hydrogen is transformed into water vapor which can readily be eliminated with drying agents or by freezing. Said furnace is heated to a temperature of 300° C. to 400° C. The combustion products of the hydrocarbons, i. e., carbonic acid and water vapor formed in the first metal oxide furnace, as well as the small portions of oxygen given off by the metal oxide at a high temperature are completely bound by the heated calcium. In the gas thus purified neither hydrocarbons nor hydrogen or nitrogen are spectroscopically detectable.

I claim:

1. In the purification of crude rare or noble gases containing as part of the impurities at least one of the gases of the group consisting of hydrogen and gaseous compounds of carbon and hydrogen the steps which comprise passing the crude gas through a heated layer of metal oxides having an oxidizing action and then over a layer of a metal of the group consisting of alkali metals and alkaline earth metals which is heated only to such temperature as is necessary to fix the nitrogen contained in the gases and then passing the treated gas mixture through another heated layer of metal oxides having an oxidizing action whereby any residues of oxidizable gases are oxidized.

2. In the purification of crude rare or noble gases containing as part of the impurities at least one of the gases of the group consisting of hydrogen and gaseous compounds of carbon and hydrogen the steps which comprise passing the crude gas through a heated layer of copper oxide having an oxidizing action and then over a layer of a metal of the group consisting of alkali metals and alkaline earth metals which is heated only to such temperature as is necessary to fix the nitrogen contained in the gases and then passing the treated gas mixture through another heated layer of copper oxides having an oxidizing action whereby any residue of oxidizable gases are oxidized.

3. In the purification of crude rare or noble gases containing as part of the impurities at least one of the gases of the group consisting of hydrogen and gaseous compounds of carbon and hydrogen the steps which comprise passing the crude gas through a heated layer of manganese oxide having an oxidizing action and then over a layer of a metal of the group consisting of alkali metals and alkaline earth metals which is heated only to such temperature as is necessary to fix the nitrogen contained in the gases and then passing the treated gas mixture through another heated layer of manganese oxide having an oxidizing action whereby any residues of oxidizable gases are oxidized.

4. In the purification of crude rare or noble gases containing as part of the impurities at least one of the gases of the group consisting of hydrogen and gaseous compounds of carbon and hydrogen the steps which comprise passing the crude gas through a heated layer of metal oxides having an oxidizing action and then over a layer of a metal of the group consisting of alkali metals and alkaline earth metals which is heated only to such temperature as is necessary to fix the nitrogen contained in the gases and then passing the treated gas mixture through another heated layer of metal oxides having an oxidizing action whereby any residues of oxidizable gases are oxidized, and removing any water still contained in the gases.

5. A method of purification of crude rare or noble gases containing as part of the impurities at least one of the gases of the group consisting of hydrogen and gaseous compounds of carbon and hydrogen which comprises conducting the impure gases first through a layer of copper oxide being heated in a furnace to about 900° C., then over a layer of calcium chips heated to a temperature of about 600° C., then again through a layer of copper oxide but only heated to about 300° C. to 400° C. and finally removing any water by freezing out.

ALWIN KRAUSS.